Feb. 23, 1926.
R. A. ENDEBROCK
LOCK
Filed Feb. 10, 1919
1,574,072
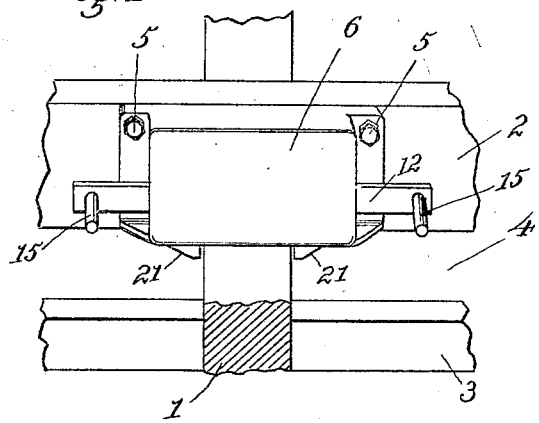
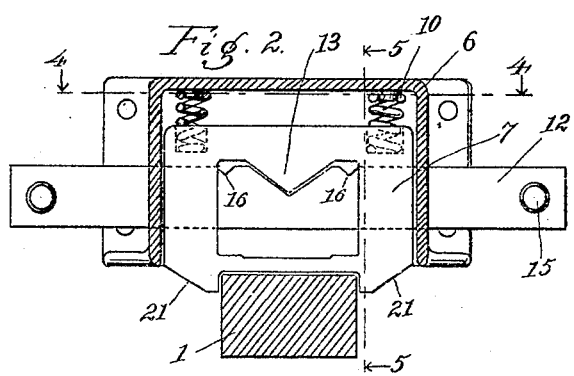
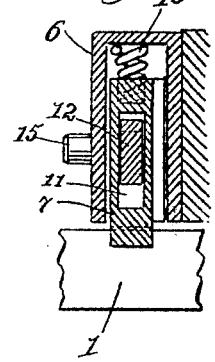
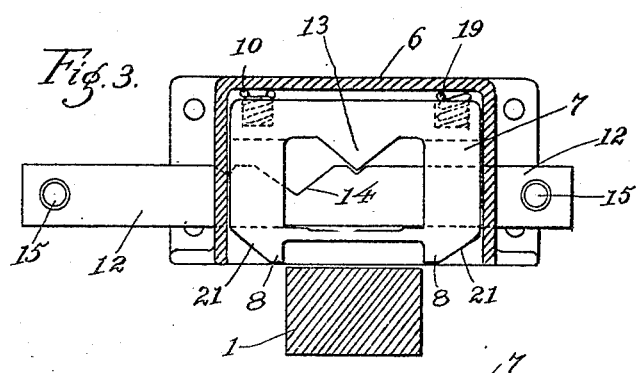
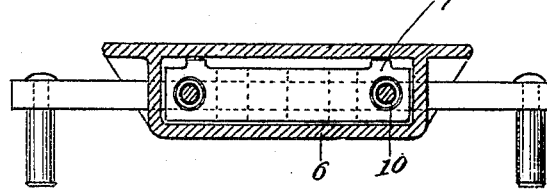
Inventor:
Robert A. Endebrock
By Allen & Allen
Attorneys.

Patented Feb. 23, 1926.

1,574,072

UNITED STATES PATENT OFFICE.

ROBERT A. ENDEBROCK, OF CINCINNATI, OHIO, ASSIGNOR TO THE TRAILMOBILE COMPANY, OF CINCINNATI, OHIO, A CORPORATION OF OHIO.

LOCK.

Application filed February 10, 1919. Serial No. 276,103.

*To all whom it may concern:*

Be it known that I, ROBERT A. ENDEBROCK, a citizen of the United States, and a resident of Cincinnati, in the county of Hamilton and State of Ohio, have invented certain new and useful Improvements in Locks, of which the following is a full, clear, and exact description, reference being had to the accompanying drawings, forming part of this specification.

The object of my invention is to provide a simple, durable and effective lock of the latch variety, which can be readily and easily operated by a sliding operating bar which shall remain permanently connected with the lock so as to be always ready for use. While my improved lock is particularly designed for use for the ready and easy locking and unlocking of bars and plates in connection with trailers for automobiles, the construction, as will be readily understood, is not intended to be confined in its application to the particular use for which I have illustrated it in the drawings.

As my improved lock is automatic in action and the latch plate will remain in locking or unlocking position as set by the operating bar, I have illustrated its use as a lock for the draft bars on trailer vehicles.

In the construction of trailers adapted to be drawn by automobiles or tractors, it has been customary to provide swiveled wheels for both the front and rear, with provision for the draft bar at both front and rear so that the trailer can be backed without changing the relative positions of the tractor in front of the trailer, by locking the draft bar in front and with it the front swiveled wheels and releasing the draft bar in the rear so that the rear wheels can be guided in backing by shifting the draft bar from side to side. Also in these constructions when the trailer is being drawn in the usual way, it is essential that the rear draft bar and with it the rear swiveled wheels shall also be locked in fixed position.

It becomes necessary, therefore, in such constructions, to frequently lock and unlock the draft bar, and my present invention provides a convenient, accessible, easily manipulated and durable locking device for such constructions.

In this connection I have illustrated in the drawing only the locking device and have not thought it necessary to illustrate the framework of an ordinary construction of trailer.

In the drawing which embodies the preferred embodiment of my invention, Figure 1 is a front perspective view of my lock.

Figure 2 is a cross section taken through the casing of the lock, with the parts in locked position.

Figure 3 is a similar view, with the lock released.

Figure 4 is a horizontal section of the lock, taken on the lines 4, 4, of Figure 2.

Figure 5 is a similar section, taken on the lines 5, 5, of Figure 2.

The draft bar is indicated at 1, and as indicated in the construction illustrated is a substantially rectangular bar in cross section, coupled usually to the framework of the trailer and having connection with the transverse connecting bar which connects the swiveled wheels on the axle, so that a movement from side to side will properly steer the swiveled wheels. This draw bar, as indicated, extends forwardly and rearwardly from the pivot connection with the frame, and is supported between the front cross bars 2, 3, which bars are securely riveted or otherwise secured at the ends to the framework, leaving an open space 4 through which the draw bar passes.

For locking the draw bar in position so that the locking device shall be readily and easily accessible and quickly and easily operated, I secure by bolts 5, or in any other suitable way, a casing 6 to the front face of the cross bar 2, in line with the midway position of the draft bar.

The casing 6 is open at its lower side, and in this casing the latch plate 7 is mounted, guided in the casing and adapted to reciprocate vertically in the casing. A pair of jaws 8, 8, depend from the latch plate 7, arranged to engage when the plate is in its lowest position, the draft bar 1. Of course the shape of these jaws will depend on the cross sectional shape of the draw bar, and I have illustrated as heretofore stated as the preferred form, a substantial draw bar rectangular in cross section, so that the jaws are also rectangular in shape. In this connection, moreover, it will be understood that a plunger bolt to engage in a socket in the draft bar could also be employed. The latch plate 7 in its upper face is provided with sockets 9 for the reception of coiled springs 10, 10, which bear between the plate and the casing, so that when released the plate will be projected downwardly to engage and lock the draft bar 1.

The plate 7 is cored out transversely, forming a rectangular guideway 11, in which is mounted to slide back and forth the operating bar 12, and the latch plate 7 is formed with a depending beveled tongue or cam 13, projecting into the guide way 11, and this tongue engages the V-shaped recess 14 in the operating bar 12.

It will be obvious that when the tongue 13 is in engagement with this V-shaped recess 14, that the coiled springs 10 will depress the latch plate 7 and lock the draft bar.

The operating bar 12 is preferably provided with handles 15 at each end, and by shifting the bar from side to side, the latch plate 7 will be raised against the tension of the springs 10 and thus release the draft bar. I find it preferable to notch the bar at each side of the beveled recess with V-shaped notches 16, to hold the bar in position when the draft bar is released, and also as the bar is shifted, the latch will click into the unlocked position, indicating that the bar has been properly shifted to release the draft bar.

The lower projecting end of the latch plate is beveled at 21 on each side in order that the locking action may be made automatic. When the draft bar is released and is at either side of the lock, in order that the draft bar shall lock automatically, the operator moves the operating bar to locking position so that the V-shaped lug or cam engages the corresponding recess 14, then as the draft bar swings into middle position, from either side the latch plate will be depressed to allow the bar to pass until the opening between the jaws is reached when the latch will snap into locking position.

It will be evident from the foregoing description that a simple and most effective lock has been provided which will lock automatically and which can be released instantly either by hand or by the kick of the foot on one of the handles 15; that it can be released or locked from either side and without the unscrewing of any nuts or bolts, merely by pushing or pulling on the operating bar. The position of the handles 15 will also indicate instantly whether the draft bar is locked or unlocked.

For use with trailer vehicles where it is of considerable importance that the various operations shall be quickly and easily performed, my construction of lock is extremely serviceable, and it is evident that it is very easily applied, and that it can be utilized in connection with any of the parts which it is desired to lock and unlock at a moment's notice and without the liability of detaching or losing any of the locking parts. While the wedge-shaped construction of the inter-engaging latch and operating bar permits ready and easy shifting from side to side for unlocking when in locked position, as the jaws of the latch grasp the draft bar on each side, no ordinary jars or strains while in use will cause the lock to release until the operating bar is actually shifted from side to side.

Having thus described my invention, what I claim as new and desire to secure by Letters Patent, is:—

1. In a lock for trailer draft bars, in combination with a draft bar, a casing secured to the frame, a latch plate shiftable vertically in said casing to engage and lock the draft bar, springs to enforce such engagement, and a transversely shiftable operating bar mounted in said latch plate, a depending V-shaped projection on the latch plate, and a corresponding recess in the operating bar to receive said projection and to permit the springs to hold the draft bar in locked position and whereby the transverse movement of the actuating bar will shift the locking plate to release the draft bar and an additional V-shaped recess in the operating bar to engage the latch whereby the bar will be held out of operative position.

2. In a lock for trailer draft bars, in combination with a draft bar, a casing secured to the frame, a sliding locking member in the casing lying normally in the path of the trailer draft bar, said member being adapted and spring-pressed to straddle the bar automatically, and means for controlling the position of the sliding locking member to position releasably locked against movement toward draft bar straddling position, and for elevating the sliding locking member away from straddling position.

ROBERT A. ENDEBROCK.